United States Patent [19]

Kobayashi

[11] Patent Number: 5,754,912
[45] Date of Patent: May 19, 1998

[54] CAMERA WITH CASSETTE EJECTOR

[75] Inventor: Kiyotaka Kobayashi, Saitama, Japan

[73] Assignees: Fuji Photo Film Co., Ltd., Kanagawa; Fuji Photo Optical Co., Ltd., Saitama, both of Japan

[21] Appl. No.: 729,686

[22] Filed: Oct. 7, 1996

[30] Foreign Application Priority Data

Oct. 9, 1995 [JP] Japan ................. 7-261778
Oct. 9, 1995 [JP] Japan ................. 7-261779

[51] Int. Cl.⁶ ................................. G03B 17/02
[52] U.S. Cl. ................................. 396/538
[58] Field of Search ................. 396/207, 208, 396/535, 536, 537, 538

[56] References Cited

U.S. PATENT DOCUMENTS

| | | | |
|---|---|---|---|
| 4,832,275 | 5/1989 | Robertson | 242/71.1 |
| 4,834,306 | 5/1989 | Robertson et al. | 242/71.1 |
| 5,271,577 | 12/1993 | Takahashi et al. | 242/71.6 |
| 5,407,146 | 4/1995 | Takahashi et al. | 242/348 |
| 5,530,504 | 6/1996 | Fuss et al. | 396/538 |
| 5,563,672 | 10/1996 | Fuss et al. | 396/538 |
| 5,604,558 | 2/1997 | Kawakita | 396/538 |

*Primary Examiner*—Howard B. Blankenship
*Attorney, Agent, or Firm*—Sughrue,Mion,Zinn,Macpeak & Seas, PLLC

[57] ABSTRACT

A camera has a cassette containing chamber and a bottom lid. A photo film cassette is inserted in the cassette containing chamber in an axial direction. The bottom lid closes the cassette containing chamber light-tightly in openable fashion. A key shaft is disposed in the cassette containing chamber, is engaged with a spool of the photo film cassette, and drives the spool. A claw portion is disposed in the cassette containing chamber in slidable fashion, and adapted to ejecting the photo film cassette. A slide mechanism, inclusive of plural springs, slides down the claw portion toward an exit opening of the cassette containing chamber through a first section and a second section following the first section. The slide mechanism in the first section applies a greater first force to the claw portion to push the photo film cassette for disengaging the spool from the key shaft. The slide mechanism in the second section applies a smaller second force to the claw portion further to push the photo film cassette.

23 Claims, 9 Drawing Sheets

CAMERA WITH CASSETTE EJECTOR

BACKGROUND OF THE INVENTION

1. Field of the Invention

The present invention relates to a camera, and more particularly a camera in which a photo film cassette can be ejected from a cassette containing chamber by an improved cassette ejector.

2. Description Related to the Prior Art

U.S. Pat. Nos. 4,832,275, 4,834,306, 5,271,577 (corresponding to JP-A 3-37645) and 5,407,146 (corresponding to JP-A 3-37645) disclose a photo film cassette of an improved type with which a camera can be loaded easily, which can be handled efficiently in a photo laboratory, and which can be treated manually with easiness by operators. The photo film cassette is characterized in that the photo film before being used is pre-contained in a cassette shell, and that rotation of a spool core advances a leader of the photo film through a photo film passage port. Differently from a cassette of an earlier type having light-shielding fabric or plush in the photo film passage port, the improved type has a light-shielding port shutter mounted in the photo film passage port to open/close it. The port shutter has a rod shape, is rotatable between an open position to open the photo film passage port and a closed position to close the photo film passage port.

The photo film cassette also has a lock mechanism for locking the port shutter. The lock mechanism consists of a lock pawl having a bar shape and being resilient. When the port shutter has the closed position, the lock pawl is engaged with a notch in the port shutter, to prevent the port shutter from accidentally rotating to the open position. To release the lock mechanism, the camera has a drive mechanism for the port shutter. The drive mechanism has an opener shaft, which is thrust into a gap between the lock pawl and the port shutter while deforming the lock pawl with resiliency.

To construct the camera in a form where the photo film cassette of this type is inserted into the camera in an axial direction thereof, it is necessary to incorporate a mechanism for ejecting the photo film cassette from a cassette containing chamber. After taking exposures, the port shutter is rotated to the closed position. The opener shaft of the drive mechanism for the port shutter is tightly squeezed between the port shutter and the lock pawl due to resiliency and rigidity of the lock pawl, so that the photo film cassette is likely not to exit from the camera when the camera is only oriented upside down with a bottom lid opened.

To push the photo film cassette out of the cassette containing chamber, a mechanism including a spring is the simplest. If the spring is too weak, the opener shaft will not be disengaged from the port shutter and the lock pawl. If the spring is too strong, the photo film cassette abruptly springs away from the camera as soon as the bottom lid is opened. The photo film cassette having sprung away is likely to fall and be damaged, to subject the photo film to ambient light. There is no known technique for pushing the camera out of the photo film cassette simply and in a reliably safe manner.

SUMMARY OF THE INVENTION

In view of the foregoing problems, an object of the present invention is to provide a camera in which a photo film cassette can be ejected safely by a simple cassette ejector from a cassette containing chamber.

In order to achieve the above and other objects and advantages of this invention, a claw portion is disposed in the cassette containing chamber in slidable fashion, contacted on the photo film cassette, and adapted to ejecting the photo film cassette. A slide mechanism slides the claw portion toward an exit opening of the cassette containing chamber through a first section and a second section following the first section, wherein the slide mechanism in the first section applies a greater first force to the claw portion to push the photo film cassette for disengaging the movable member from the drive mechanism, and the slide mechanism in the second section applies a smaller second force to the claw portion further to push the photo film cassette.

In a preferred embodiment, the lid member is a bottom lid. The claw portion is contacted on a top end of the photo film cassette and is slidable from an upper position to a lower position. The first section is from the upper position to a halfway position of the claw portion, and the second section is from the halfway position to the lower position. The first section is shorter than the second section.

The slide mechanism includes a first spring, having a first displacing stroke, for biasing the claw portion. A second spring, having a second displacing stroke longer than the first displacing stroke, for biasing the claw portion, the first and second springs being displaced in the first section together, to apply the first force to the claw portion, the second spring being further displaced in the second section after the first spring finishes displacement, to apply the second force simply to the claw portion.

Furthermore, an ejector slide plate is disposed in the cassette containing chamber in slidable fashion, has a top end from which the claw portion is disposed to project, and is biased by the second spring downwards, the ejector slide plate having the upper position while the photo film cassette is contained in the cassette containing chamber. An auxiliary slide plate is disposed in the cassette containing chamber, confronted with the ejector slide plate in slidable fashion, and biased by the first spring downwards.

The slide mechanism further comprising a coupling portion, associated with the ejector slide plate and the auxiliary slide plate, for causing the first spring to cooperate with the second spring for the ejector slide plate, to slide the ejector slide plate from the upper position to the halfway position. After the first spring finishes displacement, the second spring sliding the ejector slide plate to the lower position.

A further feature of the present invention lies in providing the camera with a detector switch for detecting containing of the photo film cassette in the cassette containing chamber. A transmission mechanism transmits movement of the lid member to the detector switch, in order to cause the detector switch to generate a cassette containing signal when the lid member is closed.

The detector switch includes a pair of contact points of metal. A switch segment of metal is moved relative to the contact points, the cassette containing signal being generated when the switch segment is contacted on both the contact points.

The detector switch further includes a switch plate on which the switch segment is disposed, and which is moved by the transmission mechanism toward and away from the contact points being stationary.

The lid member is a bottom lid. The transmission mechanism includes a first slide plate disposed in the cassette containing chamber, confronted with the switch plate in slidable fashion, and pushed upwards to an upper position by the lid member being closed. A coupling portion is associated with the first slide plate and the switch plate, for pushing upwards the switch plate in response to pushing of the first slide plate to the upper position. The switch plate causes the switch segment to be lie away from the contact points when lowered, and to be in contact with the contact points when raised.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
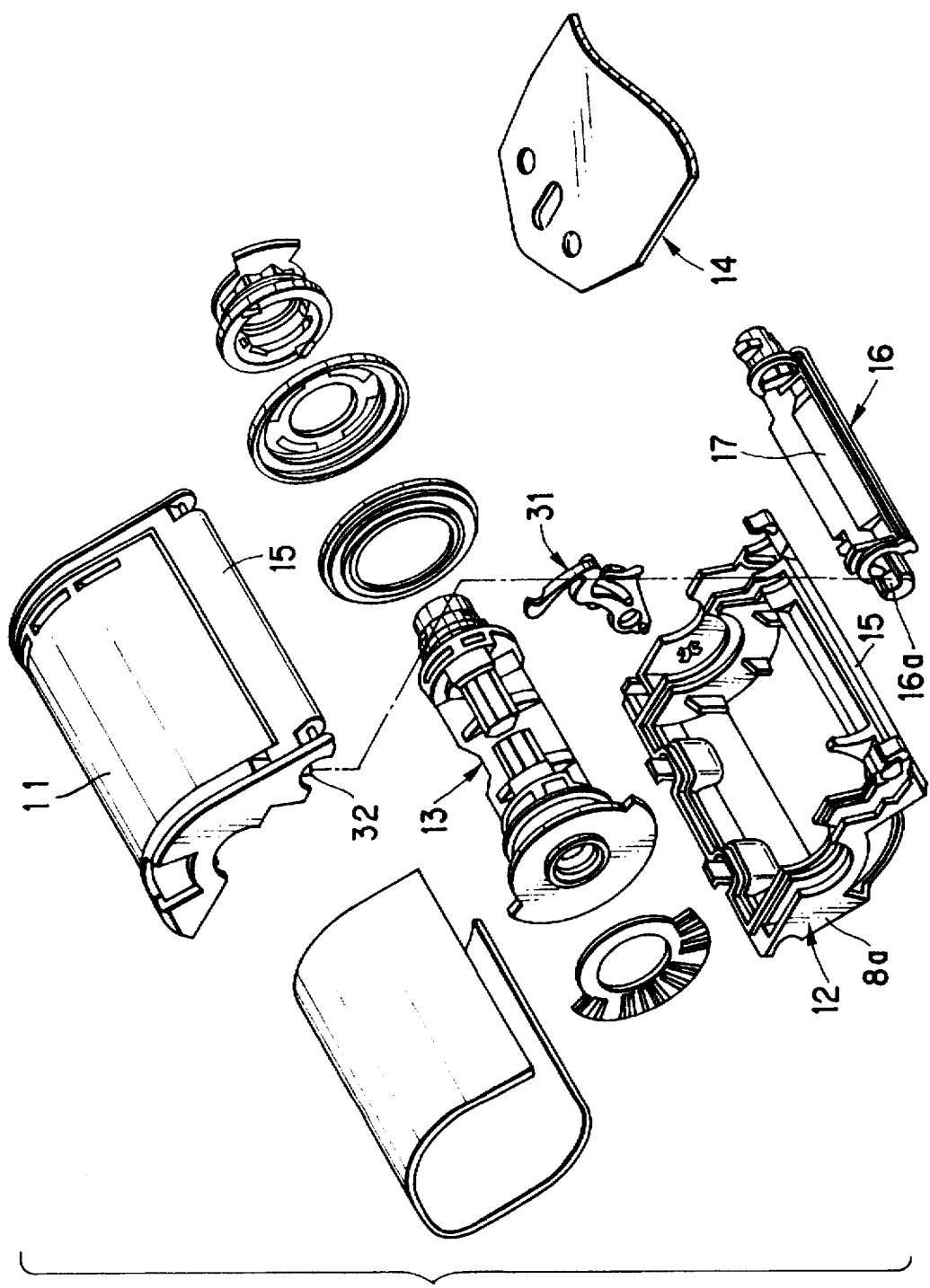
FIG. 1 is an exploded perspective illustrating a photo film cassette.

In FIG. 1, a photo film cassette 8 is constituted by a cassette shell 10 and a photo film 14. The cassette shell 10 has a cylindrical shape, and contains the photo film 14 in a roll form. The cassette shell 10 includes an upper shell half 11 and a lower shell half 12, between which a spool 13 is contained in rotatable fashion. The photo film 14 is wound about the spool 13.

The shell halves 11 and 12 are respectively semi-cylindrical, and have tongues, which are combined to define a photo film passage port 15. A light-shielding port shutter 16 is mounted in the passage port 15 in rotatable fashion. When the port shutter 16 is rotated to an open position, a flat passageway 17 is formed to pass the photo film 14 through. When the port shutter 16 rotates to a closed position, a slot formed in the passage port 15 is completely closed to shield the cassette shell 10 from ambient light.

When the port shutter 16 rotates to the closed position, a spool lock 31 blocks rotation of the spool 13. When the port shutter 16 comes to the open position, rotation of the spool 13 is unblocked. There is a lock pawl 32 formed on the inside of the upper shell half 11 for locking the port shutter 16 when having the closed position.

Figure 2A:
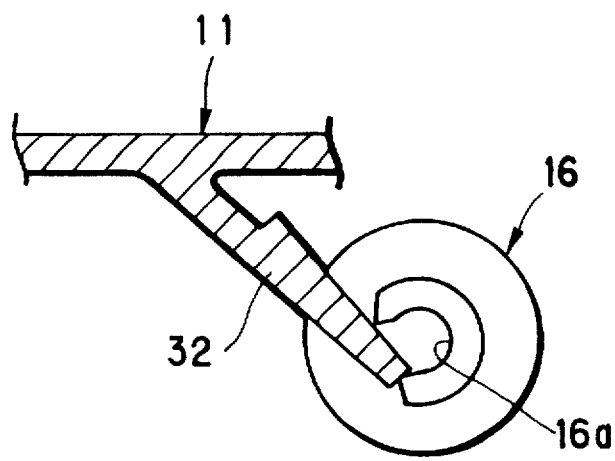
FIGS. 2A and 2B are explanatory views illustrating a lock mechanism for a port shutter of the cassette.
Figure 2B:
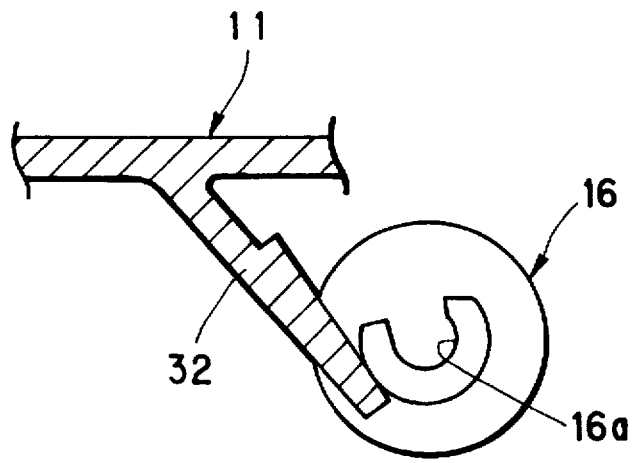

In FIG. 2A, the lock pawl 32 has a bar shape and is sufficiently rigid and resilient. When the port shutter 16 has the closed position, the lock pawl 32 is received in a notch 16a formed in an end of the port shutter 16, to avoid rotating the port shutter 16 toward the open position in the clockwise direction. When the photo film cassette 8 is set in an external device such as a camera or a display apparatus, a drive mechanism therein for the port shutter 16 accesses the lock pawl 32 and deforms the lock pawl 32 away from the port shutter 16. Then the drive mechanism rotates the port shutter 16 clockwise in FIG. 2B, to open the slot in the passage port 15.

Figure 3:
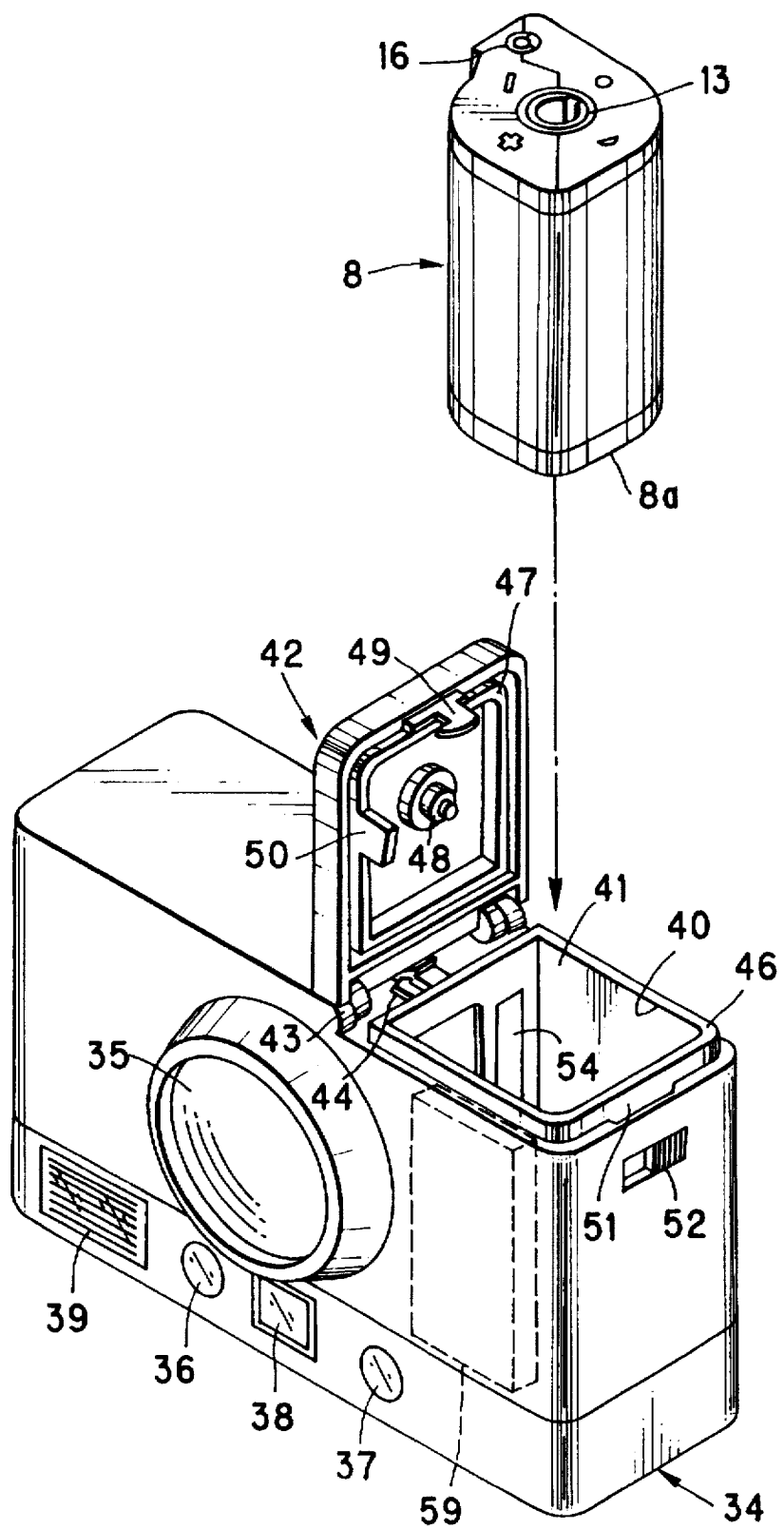
FIG. 3 is a perspective illustrating a camera oriented upside down.

A camera 34 of the present invention is now described with reference to FIG. 3. The camera 34 is illustrated herein in an upside-down orientation. The front of the camera 34 has a taking lens 35, a rangefinding beam projecting window 36, a rangefinding beam receiving window 37, a viewfinder 38, a flash emanator 39 and the like. The top of the camera 34 has a shutter release button, a power source switch, a liquid crystal display panel and the like (not shown).

A bottom of the camera 34 has an exit opening 40 through which the photo film cassette 8 is inserted in an axial direction. A cassette containing chamber 41 is formed in the camera 34 to communicate with the exit opening 40. A bottom lid 42 is disposed near to the exit opening 40, and movable between open and light-tightly closed positions to open/close the exit opening 40.

The cassette shell 10 has a top end face 8a. The photo film cassette 8 is advanced into the cassette containing chamber 41 in insertion of the photo film cassette 8. The top end face 8a has an access opening (not shown), through which a data plate (not shown) is exposed. The data plate has a bar code, which transmits data of the photo film to the camera 34.

The bottom lid 42 is supported by a pair of support portions 43 formed on the bottom of the camera 34. There is a plate spring 44 disposed between the support portions 43 for raising loadability of the photo film cassette 8 into the cassette containing chamber 41. When the bottom lid 42 has the open position, the plate spring 44 contacts on an edge of the bottom lid 42 to bias it for retaining the bottom lid 42 in the open position. A user's one hand does not need to keep the bottom lid 42 open at the same time as hold the camera 34 to be loaded with the photo film cassette 8.

A ridge 46 projects from a periphery of the exit opening 40. A groove 47 is formed in an inner face of the bottom lid 42. When the bottom lid 42 is closed, the ridge 46 is engaged with the groove 47, to avoid entry of ambient light into the cassette containing chamber 41. There are a pressing portion 48, a hook 49 and a projection 50 formed on the bottom lid 42 to project into the cassette containing chamber 41.

The pressing portion 48 is adapted to contact on an end face of the spool 13. When the bottom lid 42 is closed with the photo film cassette 8 entered in the cassette containing chamber 41, the pressing portion 48 presses the spool 13 to move the photo film cassette 8 to a predetermined position and to retain the photo film cassette 8 in the position. The hook 49 locks the bottom lid 42 in the closed position. When the bottom lid 42 is closed, the hook 49 is inserted in a slot 51 formed in an edge of the exit opening 40, and engaged with a portion of a lock button 52 disposed on a side of the camera 34. To open the bottom lid 42, the lock button 52 is slid to the left as viewed in the drawing. When the bottom lid 42 is closed, the projection 50 presses a part of a cassette ejector.

The camera 34 has a photo film gate slot 54 formed in a wall of the cassette containing chamber 41 for receiving insertion of the photo film 14 exited from the photo film cassette 8. The camera 34 incorporates an aperture frame and a pressure plate disposed in positions inward from the gate slot 54. The aperture frame is confronted with the taking lens 35, and defines an exposing range for the photo film 14. The pressure plate flattens the photo film 14 as loaded. Also a photo film roll chamber is formed in the camera 34 in a position beyond the pressure plate, and receives the photo film 14 to be wound in a roll form.

Over the cassette containing chamber 41, the camera 34 incorporates a spool drive mechanism and a port shutter drive mechanism. The spool drive mechanism rotates the spool 13 of the photo film cassette 8 in directions to wind and unwind the photo film. The port shutter drive mechanism rotates the port shutter 16 between open and closed positions. Both of the spool 13 and the port shutter 16 are movable members of the photo film cassette 8. The spool drive mechanism includes a key shaft 56 (See FIG. 6A), gears and a motor. The key shaft 56 is engaged with the spool 13, and rotated by the motor via the gears.

Figure 4A:
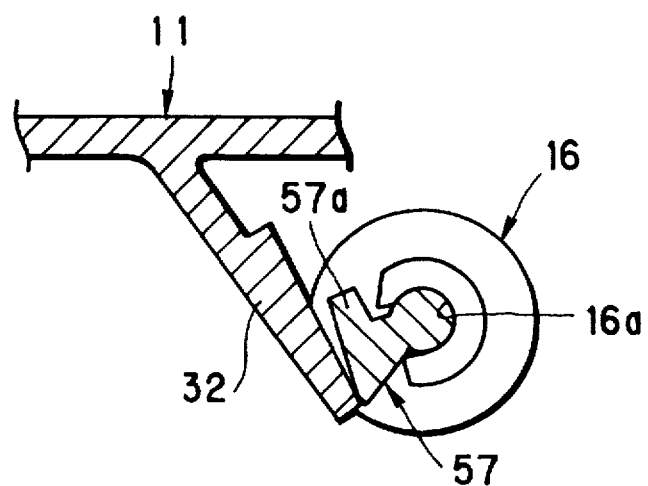
FIGS. 4A and 4B are explanatory views illustrating the port shutter lock mechanism and an opener shaft therefor.
Figure 4B:
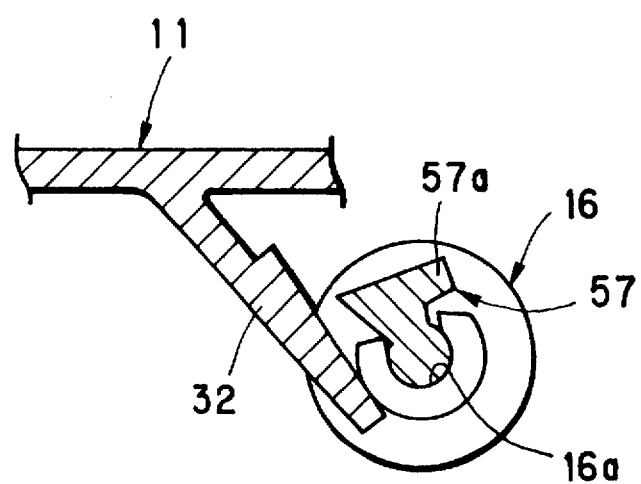

The drive mechanism for the port shutter in FIG. 4A is constituted by an opener shaft 57, a motor and the like. The opener shaft 57 is inserted in the notch 16a of the port shutter 16, and is rotated by the motor. When the photo film cassette 8 is inserted into the cassette containing chamber 41, a projecting portion 57a of the opener shaft 57 is thrust into a slight gap between the port shutter 16 and the lock pawl 32 in FIG. 2A. The projecting portion 57a deforms the lock pawl 32 to unlock the port shutter 16. The opener shaft 57 is rotated approximately by 90 degrees clockwise. In FIG. 4B, the port shutter 16 is rotated to the open position.

Figure 5:
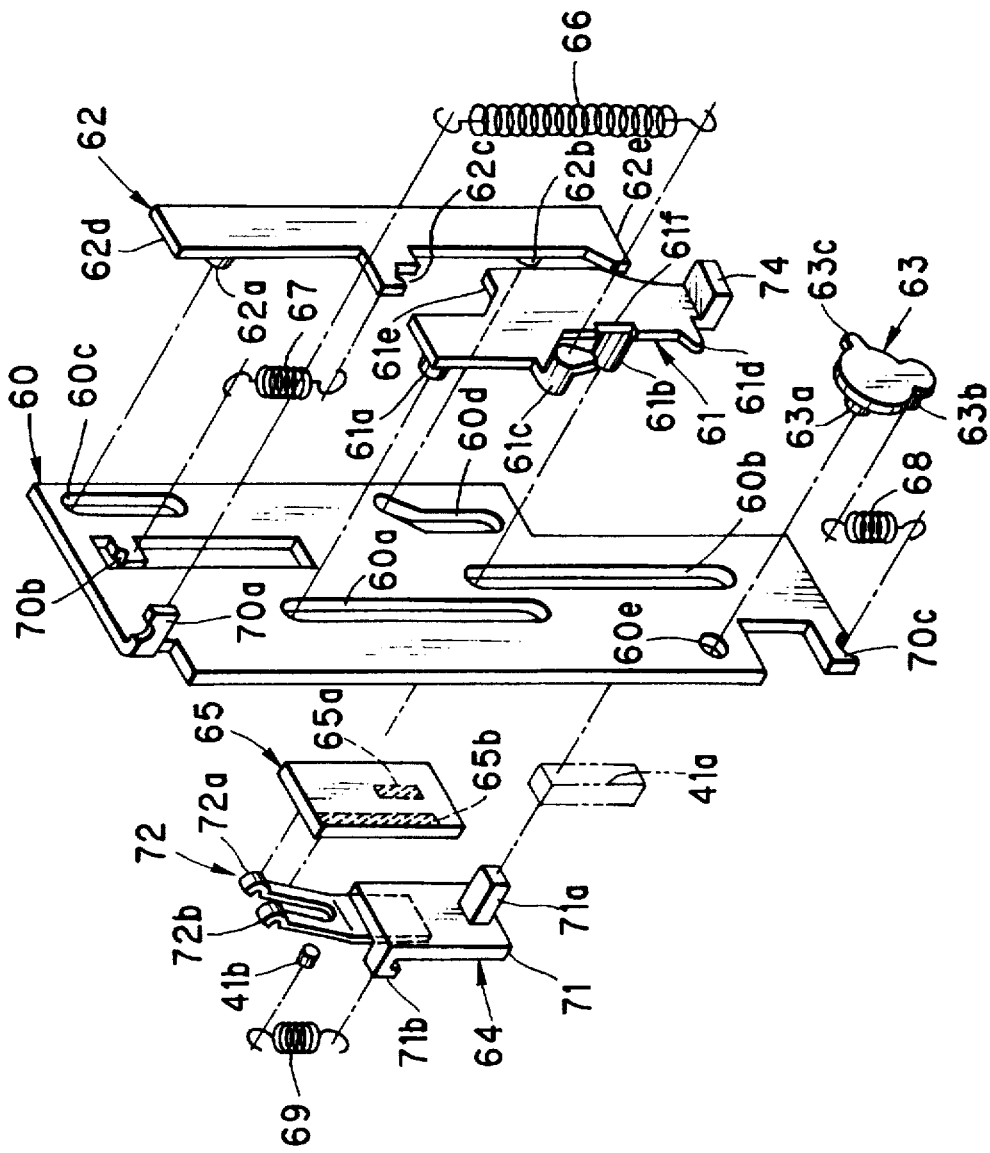
FIG. 5 is an exploded perspective illustrating an exploded perspective of a cassette ejector.
Figure 6A:
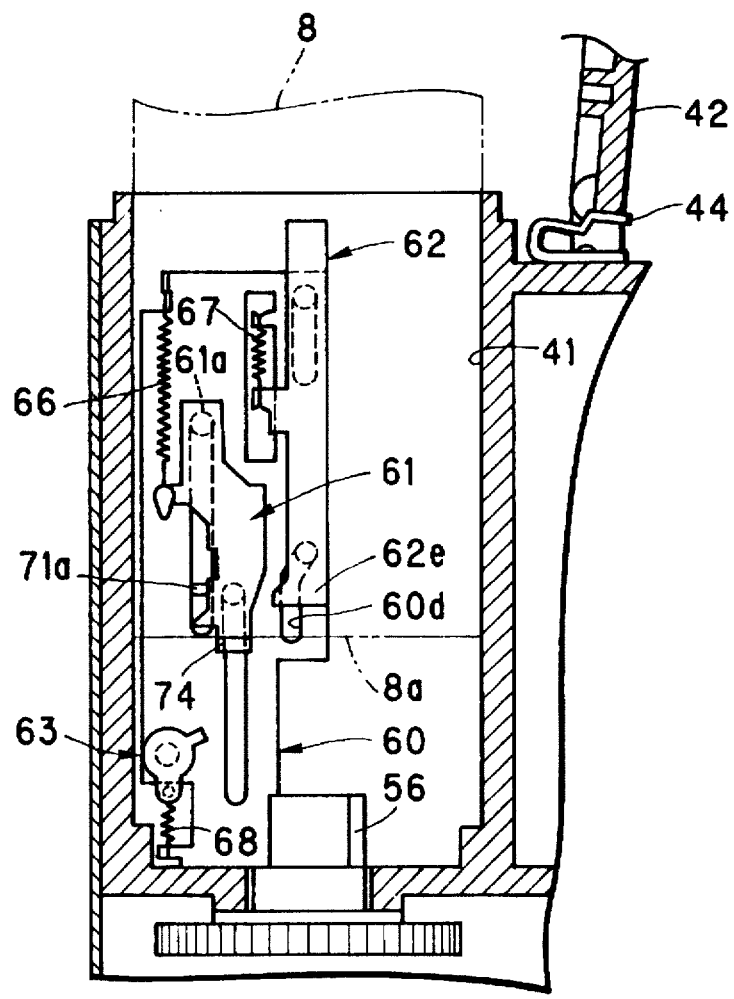
FIG. 6A is a vertical section illustrating a cassette containing chamber in which the cassette ejector appears, and has a state upon starting insertion of the cassette.
Figure 6B:
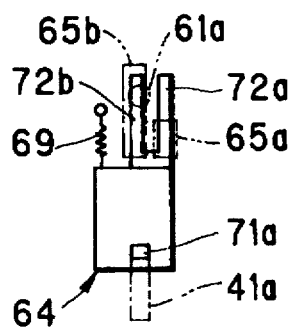
FIG. 6B is an elevation illustrating the remaining part of the cassette ejector of FIG. 6A.

There is a cassette ejector 59 incorporated in the camera 34 in a front wall of the cassette containing chamber 41 for ejecting the photo film cassette 8 from the cassette containing chamber 41. In FIGS. 5, 6A and 6B, the cassette ejector 59 includes a base plate 60, an ejector slide plate 61, an intermediate slide plate 62, a retainer 63, extension springs 66 and 67 and a retainer spring 68, which are mounted on the inside of the cassette containing chamber 41. Also the cassette ejector 59 includes a switch plate or auxiliary slide plate 64, a stationary plate 65 and an extension spring 69, which are disposed between the base plate 60 and the front of the camera 34.

Among FIGS. 6A–9B, FIGS. 6A, 7A, 8A and 9A illustrate parts of the cassette ejector 59 inside the cassette containing chamber 41. FIGS. 6B, 7B, 8B and 9B illustrate parts of the cassette ejector 59 outside the cassette containing chamber 41. The parts in FIGS. 6B, 7B, 8B and 9B are accessed by a coupling pin 61a of the ejector slide plate 61 as indicated by the phantom lines. In any of FIGS. 6A–9B, the camera is depicted upside down.

In the base plate 60 are formed slots 60a, 60b, 60c and 60d and a hole 60e. The coupling pin 61a and a pin 61b project from the ejector slide plate 61, and are inserted respectively in the slots 60a and 60b in slidable fashion. Pins 62a and 62b project from the intermediate slide plate 62, and are inserted respectively in the slots 60c and 60d in slidable fashion. A pin 63a projects from the retainer 63, and is inserted in a hole 60e in rotatable fashion. Also hooks 70a, 70b and 70c are formed on the base plate 60 for retaining respective one distal ends of the springs 66–68.

There are hooks 61c, 62c and 63b formed respectively on the ejector slide plate 61, the intermediate slide plate 62 and the retainer 63 for receiving ends of the springs 66–68. The ejector slide plate 61 is kept slidable up and down by the slots 60a and 60b guiding the pins 61a and 61b. The intermediate slide plate 62 is kept slidable by the slots 60c and 60d guiding the pins 62a and 62b. While the bottom lid 42 is open, the ejector slide plate 61 and the intermediate slide plate 62 have their lowest positions under the bias of the springs 66 and 67. The retainer 63 has an orientation of directing the hook 63b the uppermost under the bias of the retainer spring 68.

A top of the ejector slide plate 61 has a claw portion 74, which projects to the inside of the cassette containing chamber 41. As indicated by the phantom lines in FIG. 6A, the claw portion 74 is contacted on the top end face 8a of the photo film cassette 8 being entered in the cassette containing chamber 41.

Figure 7A:
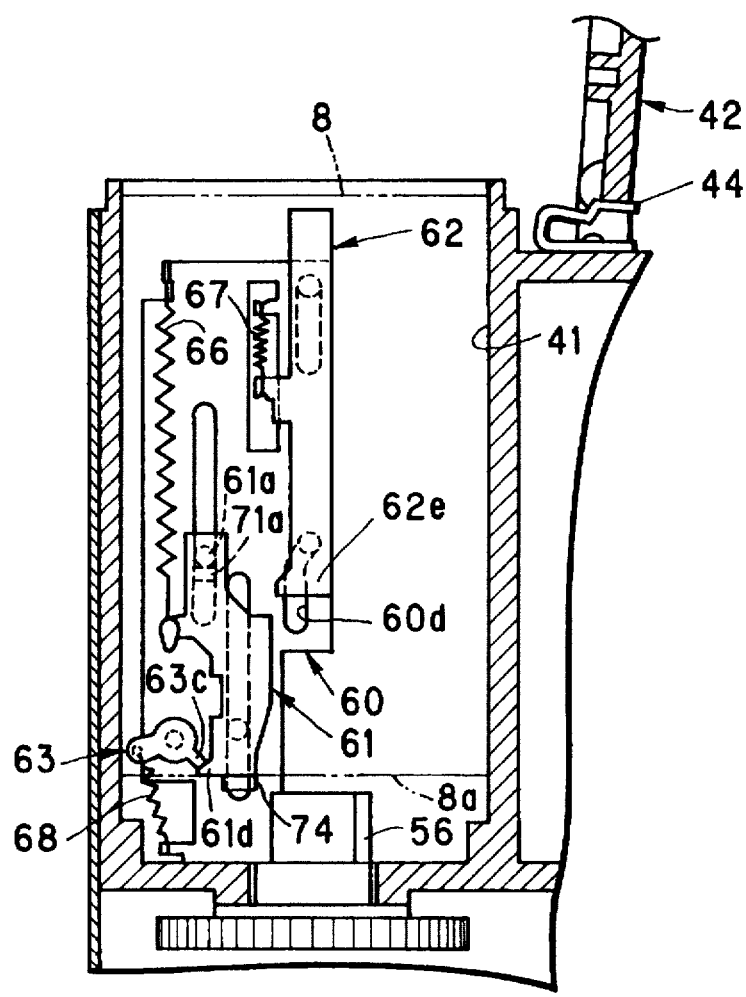
FIGS. 7A and 7B are a vertical section and an elevation illustrating the cassette ejector at the time that the cassette is completely loaded.

When the photo film cassette 8 is moved more deeply in the cassette containing chamber 41, the ejector slide plate 61 is slid upwards against the bias of the spring 66 as illustrated in FIG. 7A. In the meantime, a protrusion 61d of the ejector slide plate 61 is contacted on a protrusion 63c of the retainer 63. The movement of the photo film cassette 8 presses the protrusion 61d against the protrusion 63c, to cause the retainer 63 to rotate clockwise against the bias of the retainer spring 68. The protrusion 61d is moved upwards until being blocked by the protrusion 63c, so that the ejector slide plate 61 is retained.

If the user stops depressing the photo film cassette 8, the photo film cassette 8 does not abruptly exit from the cassette containing chamber 41. The photo film cassette 8, inclusive of its bottom, is now contained in the cassette containing chamber 41, but the spool 13 and the port shutter 16 have not been engaged with the key shaft 56 and the opener shaft 57.

When the bottom lid 42 is closed, the projection 50 of the bottom lid 42 is contacted on a bottom end 62d of the intermediate slide plate 62. The pressing portion 48 formed in the middle of the bottom lid 42 is slightly inserted in the end of the spool 13.

Figure 8A:
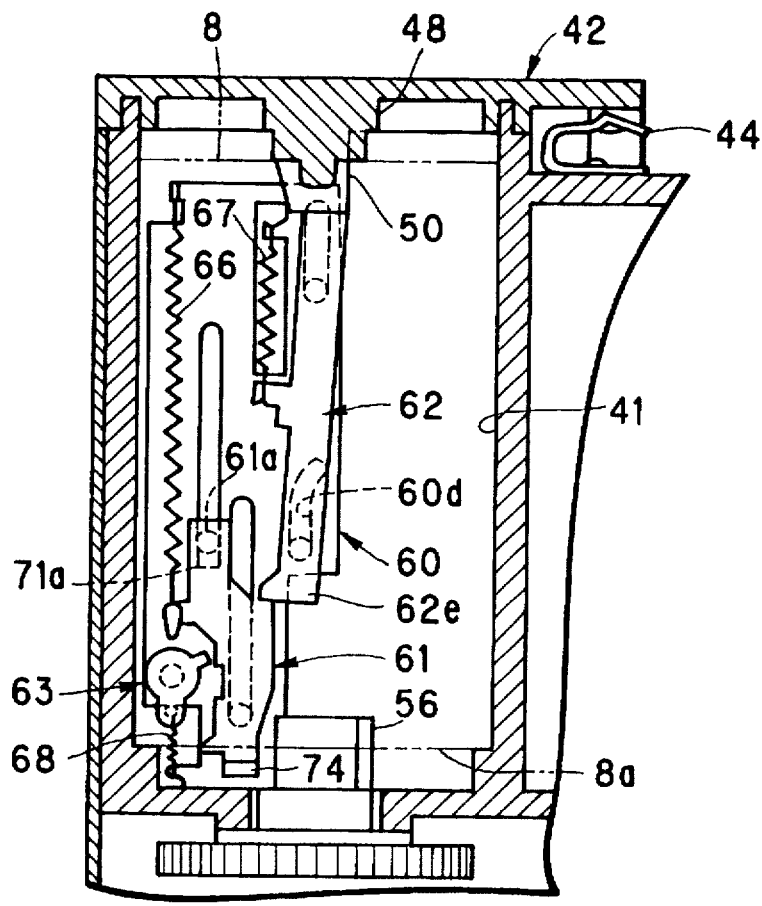
FIGS. 8A and 8B are a vertical section and an elevation illustrating the cassette ejector at the time that the cassette is halfway inserted.

Then the bottom lid 42 is fully closed. In FIG. 8A, the bottom end 62d of the intermediate slide plate 62 is pressed by the projection 50 and slid upwards while the pins 62a and 62b are guided through the slots 60c and 60d. The slot 60d has a partially inclined shape to come nearer to the ejector slide plate 61. A top end 62e of the intermediate slide plate 62 is contacted on a shoulder 61e formed in the middle of the ejector slide plate 61. The pressing portion 48 presses the spool 13 to move the photo film cassette 8 further in the cassette containing chamber 41. The ejector slide plate 61 is slid by the top end face 8a contacted on the claw portion 74.

The retainer 63 is released from the contact with the ejector slide plate 61 when a recess 61f in the ejector slide plate 61 comes to a position of the protrusion 63c. The retainer 63 is returned to its initial position by the bias of the retainer spring 68.

When the bottom lid 42 is closed, the ridge 46 on the exit opening 40 is engaged with the groove 47 in the bottom lid 42. The hook 49 of the bottom lid 42 is received in the slot 51 and engaged with the lock button 52. The bottom lid 42 is closed in light-tight fashion. Now the photo film cassette 8 comes to its uppermost position inside the cassette containing chamber 41. The key shaft 56 is engaged with the spool 13, while the opener shaft 57 is inserted in the port shutter 16. The ejector slide plate 61 also has its uppermost position by operation of the projection 50 and the intermediate slide plate 62 as the bottom lid 42 is completely closed. The claw portion 74 comes away from the top end face 8a of the photo film cassette 8. No extra force is applied to the photo film cassette 8, which will not have distortion in the shape.

The auxiliary slide plate 64 includes a flat portion 71 and a metal switch segment 72. The flat portion 71 with the switch segment 72 mounted thereon is formed from plastics.

The flat portion 71 has a coupling pin 71a projecting into the cassette containing chamber 41, and inserted in a slot 41a, which is formed in the wall of the cassette containing chamber 41. The flat portion 71 has a hook 71b to which a top end of a spring 69 is connected. A bottom end of the spring 69 is connected to a pin 41b disposed on the wall of the cassette containing chamber 41. The bias of the spring 69 keeps the auxiliary slide plate 64 in its lowest position.

Figure 7B:
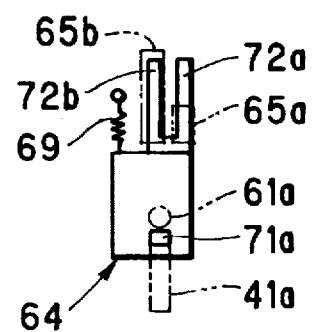

The coupling pin 71a is disposed in a path where the coupling pin 61a of the ejector slide plate 61 moves along the slot 60a. When the ejector slide plate 61 is slid upwards, the coupling pin 61a in FIG. 7B is contacted on the coupling pin 71a. When the ejector slide plate 61 is further slid up, the coupling pin 61a in FIG. 8B presses the coupling pin 71a to slide it up along the slot 41a. The whole of the auxiliary slide plate 64 is moved upwards against the bias of the spring 69.

The spring 69 has a biasing force stronger than that of the spring 66, and displacing stroke shorter than that of the spring 66. The spring 69 operates both to return the auxiliary slide plate 64 to its initial lowest position, and to eject the photo film cassette 8 from the cassette containing chamber 41 in cooperation with the spring 66.

The switch segment 72 has a fork shape and includes a pair of segment terminals 72a and 72b. The segment terminals 72a and 72b are sufficiently rigid and resilient, and are contacted on the front of the stationary plate 65. When the ejector slide plate 61 is slid to slide the auxiliary slide plate 64, the segment terminals 72a and 72b are moved while contacted on the stationary plate 65.

The stationary plate 65 is formed from plastics, and mounted on a front face inside the camera and in front of the cassette containing chamber 41. In front of the stationary plate 65 are disposed a contact point 65b having a greater length, and a contact point 65a having a smaller length. The contact point 65b is constantly contacted on the segment terminal 72b of the switch segment 72. The contact point 65a is contacted on the segment terminal 72a only when the auxiliary slide plate 64 is slid up. The contact points 65a and 65b respectively consist of a metal plate attached or retained on the stationary plate 65 for flow of electrical current.

The auxiliary slide plate 64 and the stationary plate 65 constitute a sensor of a cassette detecting circuit of the camera 34. The cassette detecting circuit is open at the contact points 65a and 65b of the stationary plate 65, and closed when the segment terminals 72a and 72b are respectively contacted on the contact points 65a and 65b simultaneously. The circuit detects existence of the photo film cassette 8 in the cassette containing chamber 41, and causes the camera 34 to effect operation of opening the port shutter 16 and advancing the photo film 14. Note that a printed circuit board having the contact points 65a and 65b can be used for the stationary plate 65.

Operation of the camera is described now. To load the camera 34 with the photo film cassette 8, the lock button 52 in FIG. 3 is operated at first to open the bottom lid 42, which is kept open by the plate spring 44. The photo film cassette 8 is inserted into the cassette containing chamber 41. Although the terminology of up, down, upper, lower and the like in the description are used to follow an ordinary orientation of the camera 34, the loading operation is effected while holding the camera 34 upside down to direct the bottom lid 42 upwards.

In insertion of the photo film cassette 8 into the cassette containing chamber 41, the top end face 8a in FIG. 6A is contacted on the claw portion 74 of the ejector slide plate 61. Further movement of the photo film cassette 8 into the cassette containing chamber 41 cause the photo film cassette 8 to press the claw portion 74. The ejector slide plate 61 is slid upwards against the spring 66 while guided by the slots 60a and 60b.

In FIG. 7A, the photo film cassette 8 is inserted in the cassette containing chamber 41 as deeply as a bottom face of the photo film cassette 8 enters the cassette containing chamber 41. Then the protrusion 61d of the ejector slide plate 61 is contacted on the protrusion 63c of the retainer 63. The photo film cassette 8 is further moved in. The retainer 63 is rotated clockwise against the bias of the retainer spring 68. The ejector slide plate 61 is retained by abutment of the protrusion 63c on the protrusion 61d. If the user's hand stops pushing the photo film cassette 8 into the cassette containing chamber 41, the photo film cassette 8 is not abruptly moved out of the cassette containing chamber 41 while the camera 34 is held upside down.

In FIG. 7B, the coupling pin 61a of the ejector slide plate 61 is only contacted on the coupling pin 71a of the auxiliary slide plate 64. The auxiliary slide plate 64 is not slid. The detecting circuit remains open without being closed. No existence of a cassette is detected by the camera 34.

The bottom lid 42 is fully closed to enclose the inside of the cassette containing chamber 41. In FIG. 8A, the projection 50 presses the bottom end 62d of the intermediate slide plate 62. The intermediate slide plate 62 is slid against the bias of the spring 67 and in accordance with the slots 60c and 60d in the base plate 60. The slot 60d is partially inclined toward the ejector slide plate 61, so that the top end 62e of the intermediate slide plate 62 comes to and presses the shoulder 61e of the ejector slide plate 61. The photo film cassette 8 is moved up inside the cassette containing chamber 41 by the pressing portion 48, to insert the key shaft 56 into the spool 13 and the opener shaft 57 into the port shutter 16.

Figure 8B:
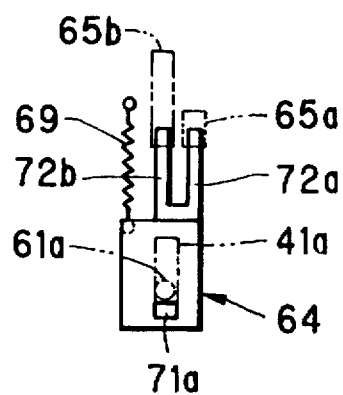

The ejector slide plate 61 is slid further upwards by the intermediate slide plate 62. In FIG. 8B, the coupling pin 61a depresses the coupling pin 71a of the auxiliary slide plate 64. The auxiliary slide plate 64 is slid upwards against the spring 69. When the bottom lid 42 is locked and completely closed, the segment terminal 72a of the auxiliary slide plate 64 is contacted on the contact point 65a of the stationary plate 65. The contact points 65a and 65b are interconnected by the switch segment 72 to close the detecting circuit. The camera 34 detects existence of the photo film cassette 8 as inserted.

With the photo film cassette 8 detected, the opener shaft 57 rotates the port shutter 16 to the open position. The key shaft 56 is driven to rotate the spool 13. The bar code printed on the data plate (not shown) is read in the camera 34, and the photo film 14 is advanced from the cassette shell 10. The photo film 14 is entered in the gate slot 54, passed between the aperture frame and the pressure plate, and moved to the photo film roll chamber to stand by for taking an exposure. When a predetermined maximum number of exposures are taken on the photo film 14 from the cassette shell 10, the key shaft 56 is rotated to wind the photo film 14 back into the cassette shell 10. Then the opener shaft 57 rotates the port shutter 16 to the closed position. The photo film cassette 8 containing the photo film 14 after the exposures is removed from the camera 34.

The bottom lid 42 is opened by operating the lock button 52. The intermediate slide plate 62 is released from being pressed by the projection 50, and is slid downwards by the spring 67. The ejector slide plate 61 is released from being pressed by the intermediate slide plate 62, and slid downwards by the bias of the spring 66 and the spring 69, which is operated via the coupling pins 61a and 71a. The protrusion 61d of the ejector slide plate 61 is contacted on the protrusion 63c of the retainer 63, which, however, is rotated in the counterclockwise as viewed from the rear in the drawing.

The claw portion 74 of the ejector slide plate 61, being slid strongly, presses the photo film cassette 8 down toward the exit opening 40 of the cassette containing chamber 41. The key shaft 56 and the opener shaft 57 are pulled away from the spool 13 and the port shutter 16. The opener shaft 57 has been squeezed between the lock pawl 32 and the port shutter 16 as depicted in FIG. 4A, but is slid away from them strongly by the ejector slide plate 61 in highly reliable fashion.

The spring 69 finishes displacement of recovering the initial shape and becomes unextended. Then the ejector slide plate 61 is only biased by the spring 66, and slid downwards but less strongly. The photo film cassette 8 is slowly moved downwards by the claw portion 74. The ejector slide plate 61 finishes being slid next. As depicted in FIGS. 6A and 6B, the photo film cassette 8 partially protrudes from the cassette containing chamber 41, and is ready to be removed.

The spring 69 recovers its initial shorter form, to return the auxiliary slide plate 64 to the initial lowest position. Again the cassette detecting circuit is opened. The camera 34 is not loaded with any cassette.

Figure 9A:
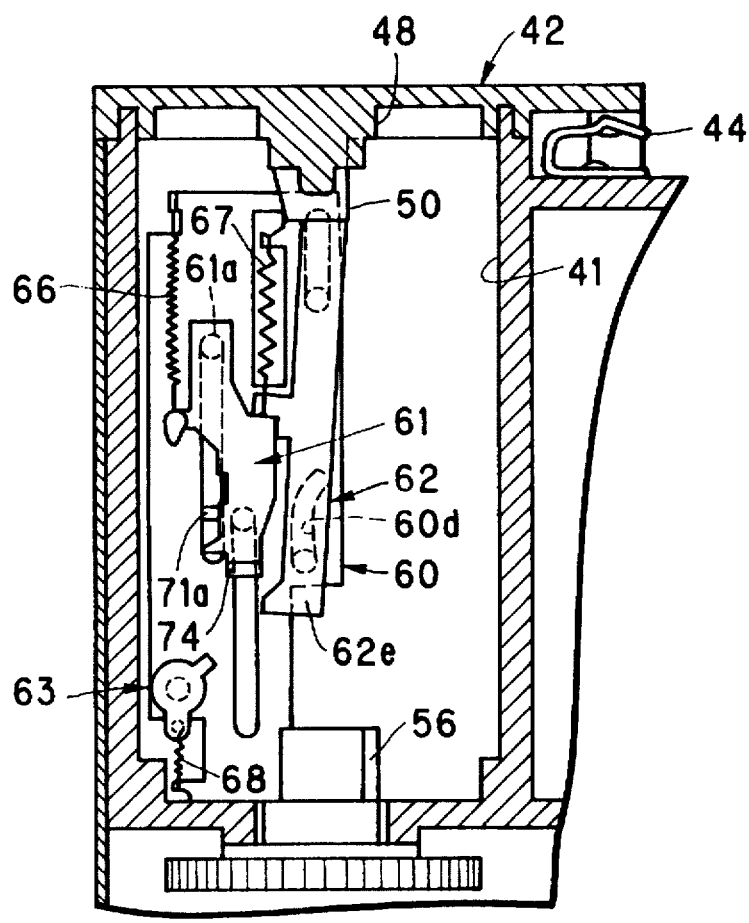
FIGS. 9A and 9B are a vertical section and an elevation illustrating the cassette ejector at the time without inserting a cassette.
Figure 9B:
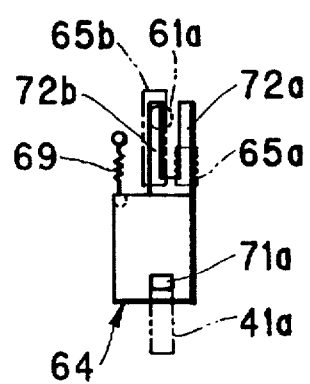

FIG. 9A illustrates a condition where the bottom lid 42 is closed without inserting the photo film cassette 8. Only the intermediate slide plate 62 of the cassette ejector 59 is pressed by the projection 50. The claw portion 74 is not pressed. Neither of the ejector slide plate 61 and the auxiliary slide plate 64 of FIG. 9B is slid. This prevents operation for standing by for taking an exposure.

In the above embodiment, the camera 34 is constructed specifically for use with the leader-advancing type of cassette. The present invention is also applicable to a camera for use with a 135 type of photo film cassette and into which the cassette is inserted by movement in the axial direction. The photo film cassette 8 is inserted through the bottom of the camera 34. The present invention is applicable to a camera which has an exit opening formed in a top, and into which a cassette is inserted downwards.

To slide the ejector slide plate 61 while the bottom lid 42 is open, the spring 66 for the ejector slide plate 61 and the spring 69 for the auxiliary slide plate 64 are used. It is possible not to use the spring 69 for the auxiliary slide plate 64, but to utilize the spring 67 for the intermediate slide plate 62 or a specifically added spring. Also it is possible to use two, three or more springs different in the displacing stroke to recover the initial shape, so that the ejection of the photo film cassette 8 can be effected in varied steps.

The cassette detecting circuit is turned on/off by the auxiliary slide plate 64 and the stationary plate 65. It is possible to add a projection, or the like to operated as a pointer or index, disposed on the front of the auxiliary slide plate 64 to protrude to the front of the camera. The projection can have two positions to signal existence/absence of the photo film cassette 8 in the cassette containing chamber 41 visually to a user.

In the above embodiment, the springs 66 and 69 for the ejector slide plate 61 and the auxiliary slide plate 64 are extension springs. It is also possible to use compression springs for biasing an ejector slide plate and an auxiliary slide plate.

In the above embodiment, the segment terminals 72a and 72b are movable up and down. The contact points 65a and 65b are stationary. Alternatively the present invention is applicable to a camera where the segment terminals 72a and 72b are stationary and the contact points 65a and 65b are movable up and down.

In the above embodiment, the contact points 65a and 65b are interconnected and turned on in response to closing of the bottom lid 42. It is also possible to construct a circuit with contact points turned off in response to closing of a chamber lid, and kept turned on while the chamber lid is open.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera, having a cassette containing chamber and a lid member, wherein a photo film cassette containing photo film is inserted in said cassette containing chamber in an axial direction, and said lid member closes said cassette containing chamber light-tightly in openable fashion, said camera comprising:

a detector switch for detecting containing of said photo film cassette in said cassette containing chamber; and a transmission mechanism for transmitting movement of said lid member to said detector switch, in order to cause said detector switch to generate a cassette containing signal when said lid member is closed.

2. A camera as defined in claim 1, wherein said detector switch includes:

a pair of contact points of metal; and a switch segment of metal, moved relative to said contact points, said cassette containing signal being generated when said switch segment is contacted on both said contact points.

3. A camera as defined in claim 2, wherein said detector switch further includes a switch plate on which said switch segment is disposed, and which is moved by said transmission mechanism toward and away from said contact points, said contact points being stationary.

4. A camera as defined in claim 3, wherein said lid member is a bottom lid;

said transmission mechanism includes:

a first slide plate disposed in said cassette containing chamber, confronted with said switch plate in slidable fashion, and pushed upwards to an upper position by said lid member being closed; and a coupling portion, associated with said first slide plate and said switch plate, for pushing upwards said switch plate in response to pushing of said first slide plate to said upper position;

wherein said switch plate causes said switch segment to lie away from said contact points when lowered, and to be in contact with said contact points when raised.

5. A camera as defined in claim 4, further comprising a claw portion, disposed on a top end of said first slide plate to project therefrom, and pushed upwards by said photo film cassette inserted in said cassette containing chamber, said first slide plate being slid to a halfway position, said claw portion being adapted to ejecting said photo film cassette from said cassette containing chamber;

wherein said transmission mechanism further comprising:

a projection disposed on said bottom lid to project into said cassette containing chamber; and a second slide plate, disposed in said cassette containing chamber in upwards slidable fashion, and pushed upwards by said projection upon movement of said bottom lid in a closing direction, for pushing said first slide plate having said halfway position to said upper position.

6. A camera as defined in claim 5, wherein said second slide plate is slidable in an upward direction into a path where said first slide plate is moved, due to inclination with reference to said moving path of said first slide plate; and said first slide plate remains unraised when located lower than said halfway position despite movement of said second slide plate.

7. A camera as defined in claim 6, further comprising a first spring for biasing said switch plate downwards away from at least one of said contact points.

8. A camera as defined in claim 7, further comprising:

a second spring for biasing said second slide plate downwards, to slide said second slide plate away from said first slide plate in response to movement of said projection away from said second slide plate upon opening of said bottom lid; and a third spring for biasing said first slide plate;

wherein said coupling portion causes said first spring to cooperate with said third spring for said first slide plate in response to movement of said second slide plate away from said first slide plate, for sliding said first slide plate from said upper position to said halfway position, said claw portion pushing downwards the photo film cassette;

after said first spring finishes displacement, said third spring slides said first slide plate down to a lower position, said claw portion further pushing the photo film cassette;

further comprising a retainer for retaining in said halfway position said first slide plate slid from said lower position.

9. A camera as defined in claim 8, wherein said coupling portion includes:

a first coupling pin disposed on said first slide plate to project toward said switch plate; and a second coupling pin disposed on said switch plate, higher than said first coupling pin, and to project toward said first slide plate, and pushed upwards by said first coupling pin.

10. A camera as defined in claim 1, further comprising:

a claw portion, disposed in said cassette containing chamber in slidable fashion, contacted on said photo film cassette, and adapted to ejecting said photo film cassette; and a slide mechanism for sliding said claw portion toward an exit opening of said cassette containing chamber through a first section and a second section following said first section, wherein said slide mechanism in said first section applies a greater first force to said claw portion to push said photo film cassette, and said slide mechanism in said second section applies a smaller second force to said claw portion further to push said photo film cassette.

11. A camera, having a cassette containing chamber, a lid member and a drive mechanism, wherein a photo film cassette containing photo film is inserted in said cassette containing chamber in an axial direction, and said lid member closes said cassette containing chamber light-tightly in openable fashion, said drive mechanism is dis-posed in said cassette containing chamber, engaged with a movable member of said photo film cassette, for driving said movable member, said camera comprising:

a claw portion, disposed in said cassette containing chamber in slidable fashion, contacted on said photo film cassette, and adapted to ejecting said photo film cassette; and a slide mechanism for sliding said claw portion toward an exit opening of said cassette containing chamber through a first section and a second section following said first section, wherein said slide mechanism in said first section applies a greater first force to said claw portion to push said photo film cassette for disengaging said movable member from said drive mechanism, and said slide mechanism in said second section applies a smaller second force to said claw portion further to push said photo film cassette.

12. A camera as defined in claim 11, wherein said lid member is a bottom lid;

said claw portion is contacted on a top end of said photo film cassette and is slidable from an upper position to a lower position; and said first section is from said upper position to a halfway position of said claw portion, and said second section is from said halfway position to said lower position.

13. A camera as defined in claim 12, wherein said first section is shorter than said second section.

14. A camera as defined in claim 13, wherein said slide mechanism includes:

a first spring, having a first displacing stroke, for biasing said claw portion; and a second spring, having a second displacing stroke longer than said first displacing stroke, for biasing said claw portion, said first and second springs being displaced in said first section together, to apply said first force to said claw portion, said second spring being further displaced in said second section after said first spring finishes displacement, to apply said second force simply to said claw portion.

15. A camera as defined in claim 14, further comprising:

an ejector slide plate, being disposed in said cassette containing chamber in slidable fashion, having a top end from which said claw portion is disposed to project, and being biased by said second spring downwards, said ejector slide plate having said upper position while said photo film cassette is contained in said cassette containing chamber; and an auxiliary slide plate disposed in said cassette containing chamber, confronted with said ejector slide plate in slidable fashion, and biased by said first spring downwards.

16. A camera as defined in claim 15, wherein said slide mechanism further comprising a coupling portion, associated with said ejector slide plate and said auxiliary slide plate, for causing said first spring to cooperate with said second spring for said ejector slide plate, to slide said ejector slide plate from said upper position to said halfway position; and after said first spring finishes displacement, said second spring sliding said ejector slide plate to said lower position.

17. A camera as defined in claim 16, further comprising:

an intermediate slide plate disposed in said cassette containing chamber in upwards slidable fashion, for pushing said ejector slide plate to said upper position; and a third spring for biasing said intermediate slide plate, to slide said intermediate slide plate away from said ejector slide plate;

wherein said coupling portion causes said first spring to operate for said ejector slide plate in response to movement of said intermediate slide plate away from said ejector slide plate.

18. A camera as defined in claim 17, further comprising a projection disposed on said bottom lid to project into said cassette containing chamber, for pushing upwards said intermediate slide plate, said ejector slide plate being pushed to said upper position, said projection being moved away from said intermediate slide plate upon opening of said bottom lid.

19. A camera as defined in claim 18, further comprising a retainer for retaining in said halfway position said ejector slide plate slid from said lower position.

20. A camera as defined in claim 18, wherein said coupling portion pushes upwards said auxiliary slide plate in response to pushing of said ejector slide plate to said upper position.

21. A camera as defined in claim 20, wherein said intermediate slide plate is slidable in an upward direction into a path where said ejector slide plate is moved, due to inclination with reference to said moving path of said ejector slide plate; and said ejector slide plate remains unraised when located below said halfway position despite movement of said intermediate slide plate.

22. A camera as defined in claim 21, wherein said coupling portion includes:

a first coupling pin disposed on said ejector slide plate to project toward said intermediate slide plate; and a second coupling pin disposed on said intermediate slide plate, higher than said first coupling pin, and to project toward said ejector slide plate, and pushed upwards by said first coupling pin.

23. A camera as defined in claim 11, further comprising:

a detector switch for detecting containing of said photo film cassette in said cassette containing chamber; and a transmission mechanism for transmitting movement of said lid member to said detector switch, in order to cause said detector switch to generate a cassette containing signal when said lid member is closed.

* * * * *